US009312893B2

(12) United States Patent
Levitt

(10) Patent No.: US 9,312,893 B2
(45) Date of Patent: Apr. 12, 2016

(54) SYSTEMS, METHODS AND DEVICES FOR ELECTRONIC COMMUNICATIONS HAVING DECREASED INFORMATION LOSS

(71) Applicant: Audimax LLC, New York, NY (US)

(72) Inventor: Harry Levitt, Bodega Bay, CA (US)

(73) Assignee: AUDIMAX, LLC, New York, NY (US)

( * ) Notice: Subject to any disclaimer, the term of this patent is extended or adjusted under 35 U.S.C. 154(b) by 0 days.

(21) Appl. No.: 14/689,396

(22) Filed: Apr. 17, 2015

(65) Prior Publication Data

US 2015/0303953 A1    Oct. 22, 2015

Related U.S. Application Data

(60) Provisional application No. 61/981,010, filed on Apr. 17, 2014.

(51) Int. Cl.
*H04B 1/04* (2006.01)
*H04B 3/54* (2006.01)
*H04L 1/06* (2006.01)

(52) U.S. Cl.
CPC .................................. *H04B 1/0475* (2013.01)

(58) Field of Classification Search
CPC ........ H04B 1/0475; H04B 1/04; H04B 3/542; H04B 2203/5408; H04B 3/54; H04L 1/0606; H04L 1/0618; H04L 27/2627; H04L 2001/0093; H04L 1/06; H04L 27/02; H04L 27/26; H04L 1/00
See application file for complete search history.

(56) References Cited

U.S. PATENT DOCUMENTS

| | | | | |
|---|---|---|---|---|
| 6,363,257 | B1* | 3/2002 | Warwick | H04L 1/0072 455/101 |
| 7,688,985 | B2* | 3/2010 | Roeck | H04R 3/005 381/313 |
| 7,835,474 | B2* | 11/2010 | Becker | H04B 1/719 375/343 |
| 9,160,413 | B2* | 10/2015 | Schneider | H04L 1/0606 |
| 2008/0130793 | A1* | 6/2008 | Rajendran | G10L 21/0388 375/317 |
| 2011/0235826 | A1* | 9/2011 | Pakzad | H04R 3/04 381/119 |
| 2011/0280181 | A1* | 11/2011 | Guey | H04L 27/2607 370/328 |
| 2012/0106366 | A1* | 5/2012 | Gauvin | H04L 43/0835 370/252 |

OTHER PUBLICATIONS

International Search Report dated Jul. 24, 2015 for PCT application No. PCT/US2015/026319.
Written Opinion dated Jul. 24, 2015 for PCT application No. PCT/US2015/026319.
International Search report and the Written Opinion of the International Searching Authority dated Jul. 24, 2015 for PCT application No. PCT/U52015/026319.

* cited by examiner

*Primary Examiner* — Pablo Tran
(74) *Attorney, Agent, or Firm* — Hunton & Williams LLP

(57) ABSTRACT

Systems, methods and devices for electronic communications having decreased information loss are disclosed. According to one embodiment, a method may include (1) at least one signal processor identifying a first segment of a signal; (2) the at least one signal processor generating a representation of the first segment of the signal; (3) the at least one signal processor identifying a first plurality of surrogate candidates in the representation of the first segment of the signal; (4) the at least one signal processor generating a representation of a second segment of the signal; and (5) the at least one signal processor encoding the first plurality of surrogate candidates as a first plurality of surrogates in the representation of the second segment of the signal.

36 Claims, 6 Drawing Sheets

| $W_i$ | $W_{i+1}$ | $W_{i+2}$ | $W_{i+3}$ | $W_{i+4}$ (515) |
|---|---|---|---|---|
| $fin_i(t)$ | $fin_{i+1}(t)$ | $fin_{i+2}(t)$ | $fin_{i+3}(t)$ | $fin_{i+4}(t)$ (520) |
| $Fin_i(f)$ | $Fin_{i+1}(f)$ | $Fin_{i+2}(f)$ | $Fin_{i+3}(f)$ | $Fin_{i+4}(f)$ (525) |
| | $F_{S_i}(f)$ | $F_{S_{i+1}}(f)$ | $F_{S_{i+2}}(f)$ | $F_{S_{i+3}}(f)$ (530) |
| | $F_{S_{i-1}}(f)$ | $F_{S_i}(f)$ | $F_{S_{i+1}}(f)$ | $F_{S_{i+2}}(f)$ (535) |
| | $F_{S_{i-2}}(f)$ | $F_{S_{i-1}}(f)$ | $F_{S_i}(f)$ | $F_{S_{i+1}}(f)$ (540) |
| | $Fout_{i+1}(f)$ | $Fout_{i+2}(f)$ | $Fout_{i+3}(f)$ | $Fout_{i+4}(f)$ (545) |
| | $fout_{i+1}(t)$ | $fout_{i+2}(t)$ | $fout_{i+3}(t)$ | $fout_{i+4}(t)$ (550) |

FIGURE 5

SYSTEMS, METHODS AND DEVICES FOR ELECTRONIC COMMUNICATIONS HAVING DECREASED INFORMATION LOSS

RELATED APPLICATIONS

This application claims priority to U.S. Provisional Patent Application Ser. No. 61/981,010, filed Apr. 17, 2014. It is related to U.S. Provisional Patent Application Ser. No. 61/938,072, filed Feb. 10, 2014, and U.S. patent application Ser. No. 14/617,527 filed Feb. 9, 2015. The disclosures of each of these documents is hereby incorporated by reference its entirety.

BACKGROUND OF THE INVENTION

1. Field of the Invention

The present invention generally relates to electronic communications, and, more particularly, to communications systems, methods and devices having decreased information loss.

2. Description of the Related Art

In today's world, we rely extensively on modern communication systems, such as mobile phones/devices, radios, televisions, etc. The popularity of these devices, and their importance in our everyday lives, is increasing rapidly.

SUMMARY OF THE INVENTION

Communications systems, methods and devices having decreased information loss are disclosed. In one embodiment, the systems, methods and devices may provide redundancy for one or more signals, signal elements, etc. by encoding the signal(s) or signal element(s) into several segments or portions (e.g., time windows) of transmission (e.g., multiple instances of the signal(s) or signal element(s) are provided during multiple transmission times) in order to compensate for traversing a transmission path with potential periods of information loss due to, for example, distortion, communication dropouts, masking, etc. A receiving device, if enabled, may decode the encoded signal(s) or signal element(s) and perform additional processing. Such processing may reproduce a perceptually identical approximation of the signal(s) or signal element(s). This may be advantageous in reproduction of lost signal information that is not received as a result of information loss, thereby decreasing the information loss experienced along the transmission path, such as dropouts, distortion, masking, and the like. A receiving device, if not enabled, may reproduce the original signal, subjected to potential information loss, without perceptual difference from a non-encoded version of the original signal.

It is an objective of the invention to provide systems, methods and devices in which a signal, such as an audio signal, may be processed prior to transmission to one or more receivers. The signal processing may decrease information loss for the signal (e.g., a signal containing speech) in the transmission path.

It is a further objective of the invention to provide systems, methods and devices in which the processed signal, including additional information, may be perceptually indistinguishable from the unprocessed signal, thereby improving the integrity of the transmitted signal without perceptually affecting the signal quality for users of receiving devices that are not enabled to decode the processed signal. Devices that can decode the signal may be referred to as "enabled devices."

In one embodiment, the surrogate candidate for one segment or time window may be encoded in, or may replace, a frequency element in another segment or time window. In one embodiment, the frequency element may be masked by a neighboring frequency element.

In one embodiment, the use of a bank of narrowband filters may be less computationally intensive than using time-to-frequency transforms, and may also reduce or eliminate the issue of discontinuities at window boundaries.

In one embodiment, the signal may be delayed one or more times, and each delayed version may be filtered by a bank of narrowband filters and spectrum representations of the delayed signals may be created by eliminating the outputs of low level narrowband filters at each filter bank.

In one embodiment, a spectrum representation of the signal with delay i+1 may be stored in memory and embedded as a surrogate in the spectrum representation of the audio signal with delay i. The spectrum representation of the audio signal with delay i+2 may be stored as a surrogate in the spectrum representation of the audio signal with delay i+1, and also stored as a surrogate in the sparse spectrum representation of the audio signal with delay i, and so on for delay i+3, etc.

In one embodiment, stored surrogates may be decoded and used to replace delayed signals that are subject to information loss (e.g., distortion, dropouts, etc.) In one embodiment, the delay in transmission may be equal to the largest delay applied to the input audio signal.

In one embodiment, if there is no information loss, some or all of the stored surrogates may be decoded and averaged so as to reduce any noise acquired in transmitting the signal.

In one embodiment, in order to transmit a signal with a bandwidth larger than that of the transmission channel, the high frequency elements in the signal that exceed the channel bandwidth may be encoded as surrogates at frequencies within the frequency range of the transmission channel. The coding may be within the same portion (delay) or across portions (delays).

In one embodiment, the surrogate candidates may be encoded in a different signal. For example, two signals may be transmitted in parallel, with a slight delay, etc. and the surrogate candidates from one may be encoded in the other.

Methods for processing a signal for transmission over a communication network are disclosed. In one embodiment, a method may include (1) at least one signal processor identifying a first segment of a signal; (2) the at least one signal processor generating a representation of the first segment of the signal; (3) the at least one signal processor identifying a first plurality of surrogate candidates in the representation of the first segment of the signal; (4) the at least one signal processor generating a representation of a second segment of the signal; and (5) the at least one signal processor encoding the first plurality of surrogate candidates as a first plurality of surrogates in the representation of the second segment of the signal.

In one embodiment, the second segment may precede the first segment. In another embodiment, the second segment may follow the first segment.

In one embodiment, the step of the at least one signal processor identifying a first segment of a signal may include the at least one signal processor dividing a signal into a plurality of segments, each segment having the same time duration.

In one embodiment, the first segment and the second segment may have different durations.

In one embodiment, a duration of at least one of the first segment and the second segment may be dynamically determined.

In one embodiment, the step of generating a representation of the first segment of the signal may include a plurality of narrowband filters filtering the first segment of the signal; and attenuating an output of the plurality of filters having a level below a predetermined threshold.

In one embodiment, the representation of the first segment and the representation of the second segment may be generated as spectrum representations using a time-to-frequency transformation In one embodiment, the method may further include transmitting the first segment of the signal and the second segment of the signal comprising the first plurality of surrogates over a communication network. The transmission of the signal may be delayed during at least one of the detection, generation, and encoding steps.

In one embodiment, the first segment of the signal and the second segment of the signal comprising the first plurality of surrogates may be combined prior to transmission. In another embodiment, the first segment of the signal and the second segment of the signal comprising the first plurality of surrogates may be transmitted in parallel. In another embodiment, the second segment of the signal comprising the first plurality of surrogates may be transmitted over a communication network.

In one embodiment, the signal may include an audio signal.

In one embodiment, the method may also include the at least one signal processor generating a representation of a third segment of the signal; the at least one signal processor identifying a second plurality of surrogate candidates in the representation of the second segment of the signal; and the at least one signal processor encoding the first plurality of surrogate candidates as a first plurality of surrogates and the second plurality of surrogate candidates as a second plurality of surrogates in the representation of the third segment of the signal.

Methods for processing a signal for transmission over a communication network are disclosed. In one embodiment, the method may include (1) at least one signal processor dividing a signal into a plurality of time windows; (2) the at least one signal processor generating a representation of a first time window; (3) the at least one signal processor identifying a first plurality of surrogate candidates in the representation of the first time window; (4) the at least one signal processor generating a representation of a second time window; and (5) the at least one signal processor encoding the first plurality of surrogate candidates as a first plurality of surrogates in the representation of the second time window.

In one embodiment, the method may further include the at least one signal processor generating a representation of a third time window; the at least one signal processor identifying a second plurality of surrogate candidates in the spectrum representation of the second time window; and the at least one signal processor encoding the first plurality of surrogate candidates as a first plurality of surrogates and the second plurality of surrogate candidates as a second plurality of surrogates in the representation of the third time window.

In one embodiment, the representation of the first time window, the representation of the second time window, and the representation of the third time window may be spectrum representations.

In one embodiment, the method may further include transmitting the first time window, the second time window comprising the encoded first plurality of surrogates, and the third time window comprising the encoded first plurality of surrogates and encoded second plurality of surrogates over a communication network.

In one embodiment, a method for processing a signal for transmission over a communication network may include (1) at least one signal processor identifying a segment i of a signal; (2) the at least one signal processor identifying a plurality of surrogate candidates in the N segments of the signal following segment i to be encoded as surrogates in segment i of the signal; (3) the at least one signal processor generating representations of the N segments of the signal; and (4) the at least one signal processor encoding the representations of the N segments of the signal as a plurality of surrogates encoded in the spectrum representation of segment i of the signal.

Methods for processing a signal that is received over a communication network are disclosed. In on embodiment, a method may include (1) at least one signal processor at an electronic device receiving a signal comprising a plurality of segments; (2) the at least one signal processor detecting information loss in a first segment; (3) the at least one signal processor retrieving a first plurality of surrogates representing the first segment embedded in a second segment; and (4) the at least one signal processor generating an estimate of the first segment from the retrieved first plurality of surrogates.

In one embodiment, the second segment may be received before the first segment is received. In another embodiment, the second segment may be received after the first segment is received.

In one embodiment, the step of the at least one signal processor retrieving a first plurality of surrogates representing the first segment embedded in the spectrum representation of the second segment may include the at least one signal processor generating a representation of the second segment; and the at least one signal processor identifying the first plurality of surrogates in the representation of the second segment.

In one embodiment, the method may further include the at least one signal processor retrieving a second plurality of surrogates representing the first segment from a third segment, and the at least one signal processor may generate the estimate of the first segment from the first plurality of surrogates and the second plurality of surrogates.

In one embodiment, the step of the at least one signal processor retrieving a second plurality of surrogates representing the first segment from the third segment may include the at least one signal processor generating a representation of the third segment; and the at least one signal processor identifying the second plurality of surrogates in the representation of the third segment. The representation of the first time window, the representation of the second time window, and the representation of the third time window may be spectrum representations.

In one embodiment, the transmission error in a the first segment may occur when the first segment is missing. In another embodiment, the transmission error in the a first segment may occur when the first segment is distorted.

In one embodiment, the reproduction of at least one of the segments may be delayed during at least one of the detection, retrieving, and generating steps.

Communication devices for transmitting a signal in a communication system are disclosed. In one embodiment, a communication device may include a memory; and at least one signal processor that performs the following: receive a signal; generate a representation of a first segment of the signal; identify a first plurality of surrogate candidates in the representation of the first segment; generate a representation of a second segment; and encode the first plurality of surrogate candidates as a first plurality of surrogates in the representation of the second segment.

In one embodiment, the signal may be received from an input device, such as a microphone, a camera, etc. In another embodiment, the signal may be received from the memory. In still another embodiment, the signal may be received from a communication network.

In one embodiment, the at least one signal processor may further perform the following: generate a representation of a third segment; identify a second plurality of surrogate candidates in the representation of the second segment; and encode the first plurality of surrogate candidates as a first plurality of surrogates and the second plurality of surrogate candidates as a second plurality of surrogates in the representation of the third segment.

In one embodiment, the at least one signal processor may generate the representation of the first segment, the second segment, and/or the third segment using a plurality of filters to filter the segments of the signal, and may attenuate an output of the plurality of filters having a level below a predetermined threshold.

In one embodiment, the representation of the first segment, the second segment, and/or the third segment may be generated by the at least one signal processor as spectrum representations using a time-to-frequency transformation.

Communication device for processing a received signal in a communication system are disclosed. According to one embodiment, a communication device may include: a memory; and at least one signal processor that performs the following: receive a signal comprising a plurality of segments; detect a transmission error in the signal in a first segment; retrieve a first plurality of surrogates representing the first segment embedded in a second segment; and generate an estimate of the first segment from the retrieved first plurality of surrogates.

In one embodiment, the at least one signal processor may further perform the following: retrieve a second plurality of surrogates for the first segment that are encoded in a third segment; and generate an estimate of the first segment from the first plurality of surrogates and the second plurality of surrogates.

In one embodiment, the communication device may further include an output for reproducing the estimate of the first segment.

In one embodiment, a device may encode a sensory signal (e.g., audio, video, tactile, etc.) in a second sensory signal such that the second sensory signal is masked perceptually by the first sensory signal so that the second sensory signal is not perceptible.

BRIEF DESCRIPTION OF THE DRAWINGS

For a more complete understanding of the present invention, the objects and advantages thereof, reference is now made to the following descriptions taken in connection with the accompanying drawings in which:

FIG. 5 is a table depicting the content and signal processing within a sequence of contiguous time windows, according to one embodiment.

DETAILED DESCRIPTION OF EMBODIMENTS

Figure 1:
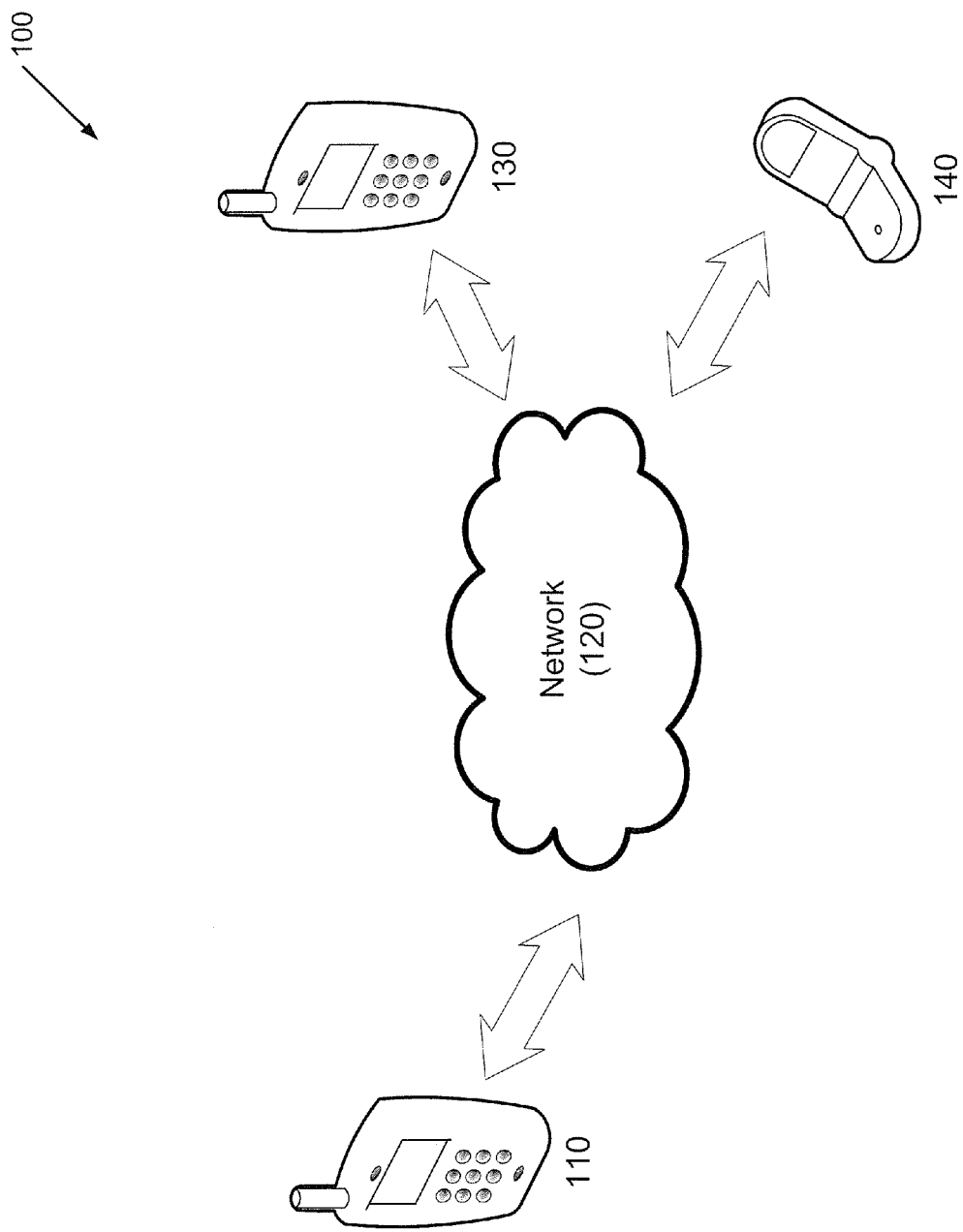
FIG. 1 depicts an exemplary system for electronic communications having decreased information loss according to one embodiment.

Several embodiments of the present invention and their advantages may be understood by referring to FIGS. 1-6, wherein like reference numerals refer to like elements.

FIG. 1 depicts a system for decreasing information loss according to one embodiment. System 100 may include, for example, transmitting device 110, communication network 120, and receiving devices 130 and 140.

In one embodiment, transmitting device 110 and receiving devices 130/140 may be any suitable device that may transmit and/or receive signals, such as audio, video, text, data, and others, including analog and digital signals. Examples include mobile phones/devices, landline telephones, hearing aids, personal amplification devices, assistive listening devices, video and audio conferencing systems, voice over IP devices, streaming radio devices, two-way radios, tablet computers, desktop and notebook computers, workstations, electronic reading devices, etc. For purposes of this disclosure, although transmitting device 110 and receiving devices 130/140 may both transmit and receive audio or audio/video signals, each will be referred based on its role in a part of a conversation or transmission.

Communication network 120 may permit communication between transmitting device 110 and one or more receiving device 130/140. Examples include plain old telephone systems (POTS), cellular networks, WiFi networks, the Internet, satellite networks, near field communications networks, Bluetooth networks, and any combinations thereof. Any suitable communications network may be used as necessary and/or desired.

In one embodiment, transmitting device 110 may be enabled to perform signal processing prior to transmission of the signal to one or more receiving device 130/140. In another embodiment, processing may occur in a device/system located along the transmission path between the sending device and receiving device, such as cellular towers, networks, repeaters, etc. The processing may be in addition to, or instead of, the processing that occurs at transmitting device 110 and/or receiving device 130/140.

In one embodiment, receiving device 130 may be enabled to process/decode received signals to decrease information loss, while receiving device 140 may include no such processing capability.

Although processing may be described in this disclosure as occurring at the transmitting and receiving devices, it should be recognized that processing may involve additional or alternative hardware (not shown) that may be separate from these devices. In addition, additional or alternative hardware in the transmission path (e.g., repeaters, amplifiers, computer servers, central office systems, cellular towers, telephone exchanges, etc.) may further or alternatively process the communications signals as necessary and/or desired. For example, a repeater may process an incoming signal to decrease information loss. Similarly, a transmitter along the transmission path may generate and transmit, for example, a "sparse spectrum representation" of the signal, and may communicate that sparse spectrum representation to a subsequent receiver, which may perform the inverse operation.

In one embodiment, a "sparse spectrum representation" may approximate the full spectrum of the unprocessed signal using a subset of frequency elements. If 16 or more frequency elements are used in a sparse spectrum representation of speech, the resulting audio signal may be perceptually indistinguishable from the unprocessed audio signal. An important property of a sparse spectrum representation is that fewer bits are required for digital storage, conversion, processing and/or transmission than for the unprocessed representation of the signal. This is particularly advantageous in storing data compressed versions of previously transmitted signals as well as the transmission of signals via communications paths with limited channel capacity (e.g., low bandwidth, limited bit rate). Transmission of fewer bits without loss of signal intelligibility or sound quality may also provide additional improvements associated with the performance metrics of communication networks. Examples of improved performance that may be realized include, but are not limited to, better network utilization, increased network throughput, and the like.

Figure 2:
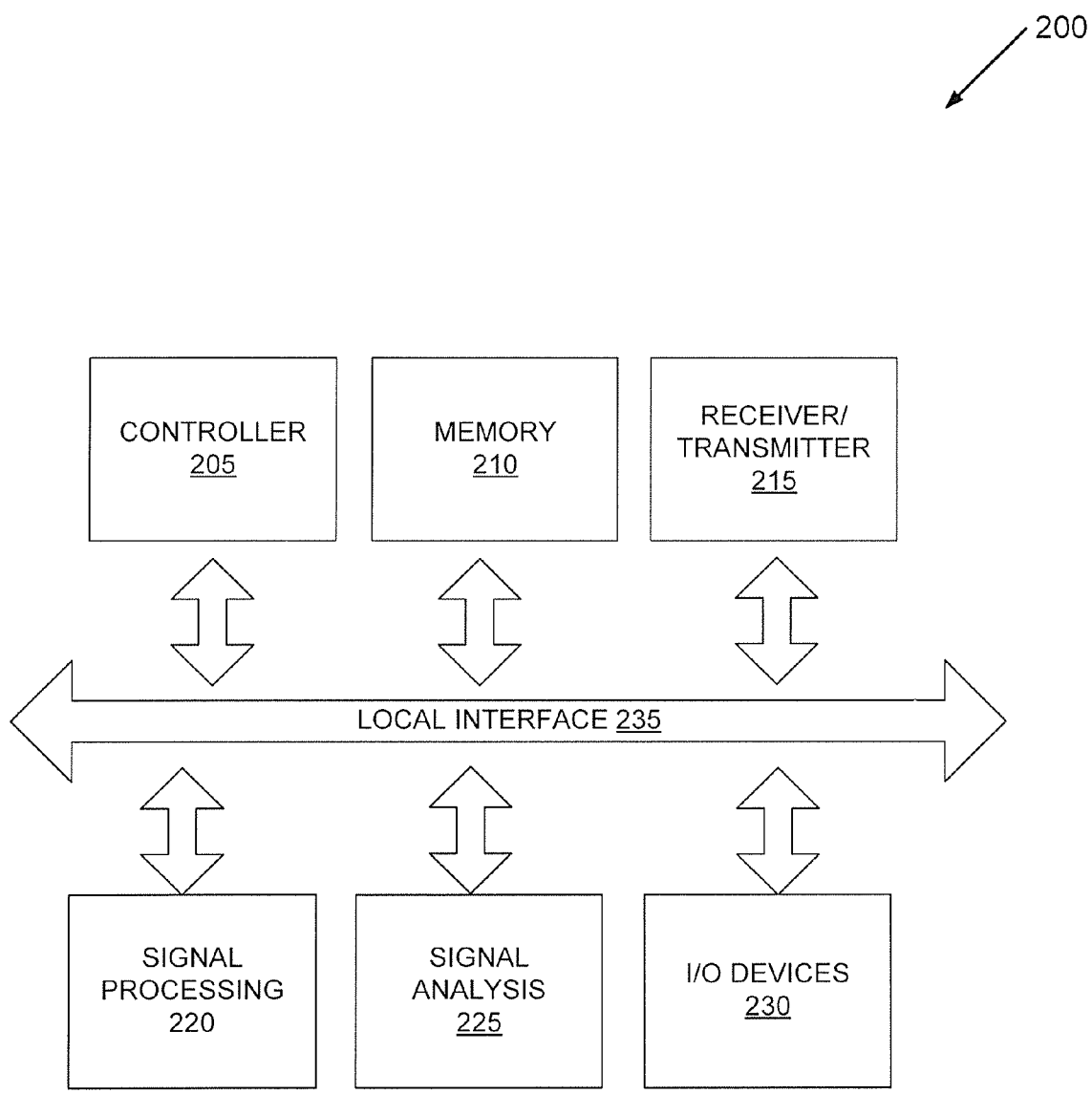
FIG. 2 depicts a block diagram for an enabled transmitting and/or receiving device according to one embodiment.

FIG. 2 depicts a block diagram for an enabled transmitting and/or receiving device. According to one embodiment, transmitting and/or receiving device 200 may be implemented in software, firmware, hardware or a combination thereof. In one embodiment, a portion of the system may be implemented in software, as an executable program, and may be executed by a special or general purpose computer, such as a personal computer, micro-computer, digital signal processor, personal data assistant, smart phone, workstation, minicomputer or mainframe computer. For example, in one embodiment transmitting and/or receiving device 200 may include controller 205, memory 210, receiver/transmitter 215, one or more input/output (I/O) devices 230, signal analysis component 225, and signal processing component 220 that are communicatively coupled via interface 235. The local interface 235 can be, for example but not limited to, one or more buses or other wired or wireless connections, as is known in the art.

In one embodiment, signal processing 220 and signal analysis 225 may be performed by the same module, hardware, and/or software. In another embodiment, a non-enabled device may not need to include one or more of signal processing 220 and signal analysis 225.

In one embodiment, the "surrogates" disclosed herein may be encoded such that the user of a receiving device that does not, or cannot, decode the surrogates in the processed signal would not perceive a change in sound quality and/or intelligibility of the processed signal. As used herein, a "surrogate" refers to one or more signal element(s), such as speech sound elements, time elements, or frequency elements, that are encoded to provide redundancy such that if a component of the signal is lost as a result of, for example, distortion, dropouts, etc., a surrogate of the lost component may be used in its stead to mitigate or eliminate the information loss. Surrogates of signal components that are likely to be lost or degraded may be encoded within a representation of the same signal or of another signal (e.g., in the frequency, time, or phase coordinates of a signal representation).

Figure 3:
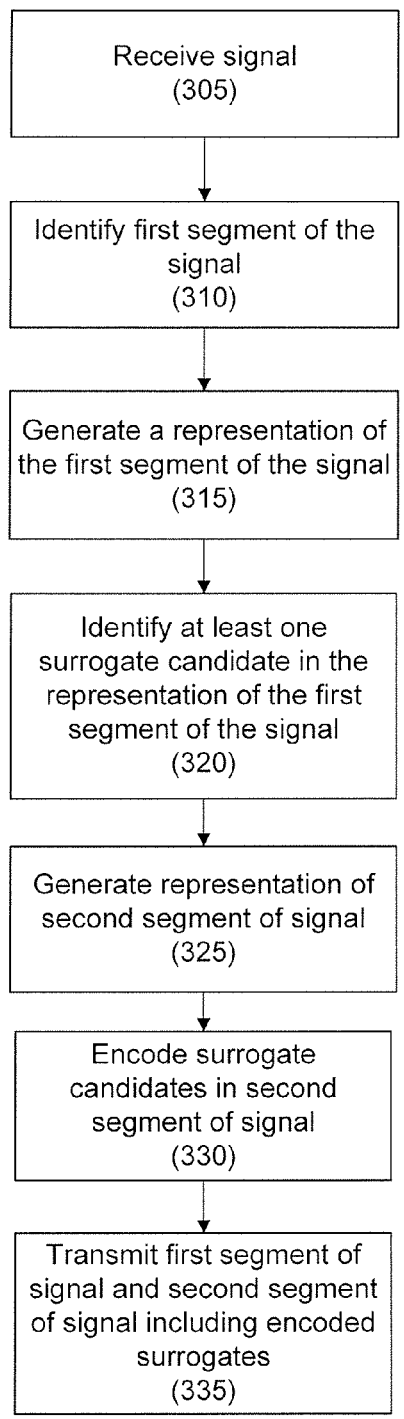
FIG. 3 depicts a method for electronic communication having decreased information loss according to one embodiment.

Referring to FIG. 3, a method for decreasing information loss according to one embodiment is provided. In step 305, a signal may be received. The signal may be an audio signal, a video signal, a combination, etc. The signal may be received directly (e.g., spoken by a human) or indirectly (delivered by a loudspeaker or by a wired or wireless magnetic or electromagnetic link), etc.

In step 310, a first segment or portion (e.g., time window) of the signal may be identified. In one embodiment, the signal may be sampled at a predetermined rate, may be divided into a number of segments, may be continuously identified, etc. In another embodiment, the first segment of the signal may be dynamically determined. Other ways of identifying the first segment of the signal may be used as is necessary and/or desired.

In step 315, a representation of the signal in the first segment may be generated. As will be discussed in greater detail below, the representation may be a spectrum representation. In one embodiment, the spectrum representation may be obtained by transforming the segment of the signal from the time domain to the frequency domain. In another embodiment, a bank of narrowband filters may be used, and the output of narrowband filters with low output levels may be attenuated or eliminated to produce a sparse spectrum representation of the audio signal using time domain processing.

In step 320, at least one surrogate candidate may be identified in the representation of the first segment of the signal. As will be discussed in greater detail below, a surrogate refers to an encoded version of a signal, or element of a signal (the "surrogate candidate"), that may be embedded elsewhere in the signal such that if the surrogate candidate is degraded or lost as a result of a dropout or distortion, it can be replaced by decoding the surrogate.

In step 325, a representation of the signal in the second segment may be generated. This may be done in the same manner as discussed above.

In step 330, the surrogate candidate(s) in the first segment may be encoded and embedded as surrogates in the second segment of the signal. In another embodiment, the surrogate candidate(s) may be encoded and embedded in a segment of a second signal.

In step 335, the first segment of the signal and the second segment of the signal may be transmitted. In one embodiment, the second segment of the signal may be combined with the first segment of the signal before transmission. In another embodiment, the second segment of the signal may be transmitted in lieu of the first segment of the signal. In still another embodiment, the second segment of the signal may be transmitted in parallel with the first segment of the signal.

In one embodiment, the second segment containing surrogates of the first segment may be transmitted before the first segment is transmitted. Thus, if there is information loss for the first segment, the surrogates for the first segment in the second segment may be used to reproduce the first segment.

In another embodiment, the second segment containing the surrogates of the first segment may be transmitted after the first segment, and if there is information loss for the first segment, the surrogates for the first segment in the second segment may be used to reproduce the first segment. This may involve delaying the reproduction of the signal.

Figure 4:
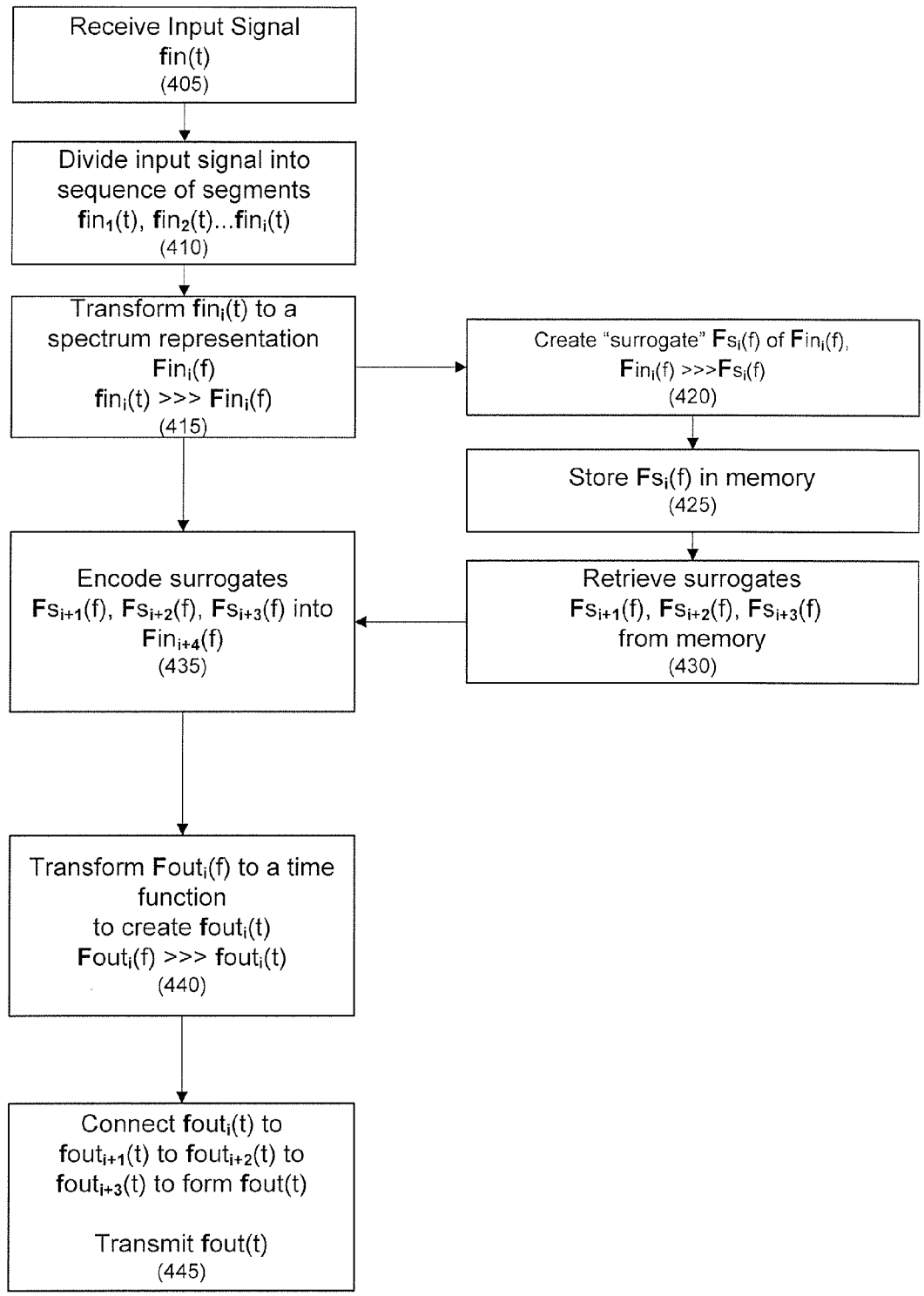
FIG. 4 depicts a method for electronic communication having decreased information loss according to one embodiment.

FIG. 4 depicts a method for decreasing information loss according to one embodiment. For convenience, this method is described using time windows containing segments or portions of the signal); it should be recognized that this method is not limited to the use of time windows, and it may be used with signal segments, signal portions, etc.

In step 405, an input signal, fin(t), may be delivered to a transmitting device. In one embodiment, the audio signal may be delivered to a transmitting and/or receiving device, for example, a mobile phone/device, landline telephone, hearing aid, personal amplification device, assistive listening device, video and audio conferencing system, voice over IP device, streaming radio device, two-way radio, tablet computer, desktop or notebook computer, workstations, etc. In one embodiment, an audio signal may be delivered directly (e.g., spoken by a human) or indirectly (delivered by a loudspeaker or by a wired or wireless magnetic or electromagnetic link), etc.

In one embodiment, the transmitting device may perform optional signal pre-processing. For example, pre-processing techniques for improving various audio signal performance characteristics such as, signal-to-noise ratio, signal strength, sound quality, intelligibility, etc., may be applied during signal pre-processing. This may include signal pre-whitening, signal boosting, signal amplification, frequency filtering, frequency transposition, noise attenuation, and the like. One or any combination of the aforementioned conventional pre-processing techniques, or other techniques, may be employed as necessary and/or desired.

In one embodiment, the signal may be delivered as a signal represented in the time domain. For example, the input time function fin(t), may characterize the signal delivered to the transmitting device.

In step 410, the input signal, fin(t) may be divided into a sequence of contiguous time windows, $W_1, W_2, W_3, \ldots W_i$, with the time function within time window $W_i$ being represented by $fin_i(t)$. A time window may comprise a number of discrete elements of the signal. For example, a signal may be divided into a sequence of time windows, each having a finite duration, such as 20 milliseconds (ms). Each 20 ms time window may contain digital 200 samples of the signal. This corresponds to a sampling rate of 10,000 samples per second. A digital system with this sampling rate, according to the Nyquist-Shannon sampling theorem, can transmit frequencies up to 10,000/2 Hz=5 kHz without aliasing. A description of the Nyquist-Shannon sampling theorem and its development is provided in H, Nyquist, "Certain Topics In Telegraph Transmission Theory", Trans AIEE, vol. 47, pp. 617-44 April 1928 (reprinted as a classic paper in Proc. IEEE, Vol. 90, No. 2, February 2002) and C. E. Shannon, "Communication In The Presence Of Noise", Proc. Institute of Radio Engineers, vol. 37, no. 1, pp. 10-21, January 1949 (reprinted as a classic paper in: Proc. IEEE, Vol. 86, No. 2, (February 1998)). The disclosure of each of these documents is hereby incorporated, by reference, in its entirety.

In one embodiment, a signal of a given time duration may be approximately recreated using a reduced set of signal elements that are included within the time window. A signal of a given time duration may also be approximately recreated using a reduced set of signal elements that are included within a neighboring time window. The time windows in a sequence may be equal in time duration, or they may have different time durations. The windows may be overlapping, or non-overlapping.

In one embodiment, certain parameters associated with the time signal, such as the number of windows, the time duration of windows, parameters of the variables within each window, etc. may be predetermined. For example, time windows may have parameters that are determined prior to receiving the signal, such as 16 windows in a sequence that are each 20 milliseconds (ms) in length. In another embodiment, the time window parameters may be dynamically determined, such as being determined based on the sampling rate of the signal (e.g., the signal is converted into a sequence of discrete samples obtained in a time period). In another embodiment, the time window parameters may be dynamically determined based on an identified time length of the signal. In another embodiment, the time window parameters may be dynamically determined based on the past, current and/or projected frequency of dropouts of the transmitted signal. In another embodiment, the time window parameters may be dynamically determined based on device restrictions (e.g., the processing capabilities or memory capabilities of the transmitting/receiving device), or by information capacity (e.g., bandwidth constraints, bit rate, etc.) of the transmission channel. Other ways of dividing a signal into a sequence of time windows may be used as necessary and/or desired.

The duration of the time windows and the number of samples may be varied and selected as is necessary and/or desired.

In step 415, signal analysis may be performed on the input audio signal $fin_i(t)$ in window $W_i$ in order to transform the time function to a representation, such as a spectrum representation, that may be characterized in the frequency domain. The transformation may be accomplished, for example, by obtaining a discrete Fourier transform, for example, of $fin_i(t)$ in order to obtain a corresponding discrete spectrum representation, $Fin_i(f)$, of the time signal.

Suitable transforms that may be used to obtain the spectrum representation may include, for example, a continuous Fourier transform, a discrete Fourier transform, a fast Fourier transform, a continuous wavelet transform, a discrete wavelet transform, a fast wavelet transform, and continuous, discrete, short-term, and fast versions of related transforms such as the Laplace, Stieltjes, Z-transform, Hilbert, Gabor, Wigner, Mellin, and Borel transforms, and the like. Any other suitable transform or mathematical operation may be used as is necessary and/or desired. Short-term versions of these transforms are appropriate for time signals of finite duration, e.g., 20 ms.

In one embodiment, a time-to-frequency transform may also be implemented by means of filtering in the time domain. One such transform analogous to a discrete Fourier transform filters the time signal using a bank of contiguous narrow band frequency filters with center frequencies equal to the discrete frequencies in the discrete Fourier transform. The impulse response of each narrow band filter is equal to the time waveform of the corresponding frequency element in the set of orthogonal sinusoidal signals used in multiplying the time signal in the discrete Fourier transform. The output of each narrowband filter is then integrated over a time interval equal to the duration of the time window in the discrete Fourier transform.

In one embodiment, each narrowband filter may have an averaging time equal to the averaging time of the ear. The bandwidths of the narrowband filters may increase with frequency in the same way that the critical band of hearing increases with frequency. The averaging time of each narrowband filter may vary as a function of its center frequency in the same way that the averaging time of the ear varies with frequency. The phase shift of each narrowband filter may vary with frequency in the same way that the phase characteristics of hearing vary with frequency. In this embodiment, the frequency representation of the audio signal provided by the filter bank approximates the frequency representation of an audio signal provided by the peripheral filtering of audio signals in the human ear.

A narrowband filter with a high output level will mask the output of a nearby filter with a low output level. In one embodiment, the outputs of filters with low output levels that are masked by filters with high output levels may be attenuated such that the spectrum representation of the audio signal at the output of the filter bank is analogous to the sparse spectrum representation of the spectrum in a frequency domain analysis of the audio signal using a discrete Fourier transform, or other time-to-frequency transform.

In one embodiment, the outputs of filters with low output levels that are masked by filters with high output levels may be attenuated such that that the sum of the outputs of the filters with high level outputs is perceptually indistinguishable from the unfiltered signal, although only a small proportion of the narrowband filters in the filter bank may be active.

In another embodiment, the narrowband filters that are not active in the embodiment described above may be replaced by surrogates of other filter banks with a limited number of active filters.

In one embodiment, filters with high level outputs may be attenuated and filters with low level outputs may be amplified to recover the sparse spectrum surrogates.

In one embodiment the output level of each narrowband filter may be sampled at regular intervals in time to determine how the frequency representation of the audio signal varies with time.

In one embodiment the output level of each narrowband filter is sampled at time intervals equal to the averaging time of the ear to determine the time-varying changes in the spectral representation of the audio signal that are perceptible to the human ear.

In one representation, the audio signal may be delivered to one Filter bank i and then delayed and delivered to Filter bank i+1, and then delayed and delivered to Filter bank i+2, and so on until Filter bank i+j. The output of Filter bank i is then delayed until Filter bank i+j is reached. The sparse spectrum representation at the output of each filter bank is embedded as a surrogate in the output spectrum representation of Filter bank i. The outputs of all the filters in filter bank i are then summed to generate a time signal containing surrogates of Filter banks i+1 to i+j that is then transmitted to a receiving device.

The transmitted signal will not be perceptually distinguishable from the summed output of Filter bank i with no embedded surrogates.

In one embodiment, a receiving device may decode the received time signal using time to-frequency transforms, such as the discrete Fourier transform, or by means of a time domain analysis using a bank of narrowband filters with the same filtering characteristics as the filters used in generating the transmitted signal.

In another embodiment, a discrete Fourier transform, or a related transform, may be used in conjunction with the time domain analog of the transform implementing the more advantageous transform at different stages of processing.

In one embodiment, two processes may proceed in parallel. For example, the spectrum representation generated in step 415 may continue to both steps 435 and 440.

In step 420, one or more "surrogates" of the signal in several time windows ($W_i$ to $W_{i+j}$) may be created. For purposes of illustration, j=3 is used in most examples. A surrogate refers to an encoded version of a signal, or element of a signal (the "surrogate candidate"), that may be embedded elsewhere in the signal such that if the surrogate candidate is degraded or lost as a result of a dropout or distortion, it can be replaced by decoding the surrogate. The encoding and embedding of surrogates in various time and/or frequency locations of the signal provides redundancy that may be useful in decreasing information loss as a result of distortions or dropouts. Surrogates may be encoded to provide redundancy within a representation of the signal in the same window or in a different window. Surrogates may be transformations that are characterized in frequency and/or time.

In one embodiment, sparse spectrum representations are used to reproduce signals from several time windows. A sparse spectrum representation uses fewer spectrum elements than a full spectrum representation. Since sparse spectrum representations may require significantly fewer bits for storage, the signal from several preceding time windows can be encoded and stored in the current time window without exceeding the available information capacity (e.g., the bandwidth or bit count) of the window.

The surrogates may be encoded so as to be embedded steganographically in the transmitted signal. By steganographic embedding is meant embedding that is not perceptible to a user of a receiving device that is not enabled to decode the embedded surrogate. One form of steganographic embedding for audio signals is to encode the surrogates in frequency elements that are masked by stronger frequency elements in the signal (such as a spectral peak) and are not audible to the human ear, but can be detected and decoded by an electronic device. Another form of steganographic embedding for audio signals is to encode the surrogates in time elements that are masked by stronger time elements in the signal (such as a stressed speech sound) and are not audible to the human ear, but can be detected and decoded by an electronic device. A third form of steganography may embed surrogates in the phase vector of the spectrum of the transmitted signal. Since the ear is insensitive to within-ear phase differences, the embedded surrogates in the transmitted signal are not audible to a user of a non-enabled receiver.

In another embodiment, each of the surrogates may be encoded within the spread-of-masking range of a strong frequency element of the input audio signal. For example, the surrogate may be embedded within a predetermined frequency range (e.g., 50 Hz above, a percentage above, etc.) of a corresponding strong frequency element in the input signal so as to mask the surrogate such that it is not audible to the human ear, but can be detected and decoded by an electronic device. The surrogate may be at a predetermined or dynamically determined intensity relative to the corresponding strong frequency element (e.g., 50% lower intensity, 3 dB lower intensity, etc.). Optimizing or maximizing the surrogate's intensity, power and/or amplitude within the masking range of a corresponding strong frequency element may improve the likelihood that the surrogate is electronically detectible upon reception even if noise is present in the transmitted signal.

In another embodiment, the surrogate(s) may be encoded within a time function, by embedding the surrogate within the temporal spread-of-masking range of an intense sound. Surrogates may also be embedded within both the temporal and spectral spread-of-masking range of sounds with a combination of strong spectral and temporal features.

In one embodiment, the surrogate(s) may be encoded in the phase vector of the spectrum representation of the input signal. In particular, the amplitude and frequency of each component of a surrogate may be stored as the phase of one or more spectral components in the spectrum representation of the input signal. This embodiment may have minimal effect on the perception of a received audio signal since the human auditory system is not sensitive to within-ear phase differences.

In another embodiment, steganography may be used to encode data regarding the surrogate(s) (e.g., original frequency, amplitude, intensity, phase, etc.). These data may be used to reproduce or adjust the surrogate during decoding.

In still another embodiment, a fixed offset to the inaudible range (e.g., +20 kHz) may be used.

A combination of one or more of the above techniques may be used. Moreover, any other suitable method for encoding the surrogates may be used as necessary and/or desired.

Analogous forms of steganographic embedding may be used with video signals, such as embedding video surrogates in pixels that are masked by more intense neighboring pixels in a video image. With digitized signals, audio or video, surrogates may be embedded in the least significant bits of a digital audio or video sample. One or any combination of the aforementioned forms of steganographic embedding, or other steganographic techniques, may be employed as necessary and/or desired.

For audio signals, the signal elements selected for surrogate encoding (the surrogate candidate) may be selected based on parameters of frequency or time transformations. For example, a sparse spectrum surrogate may comprise frequency elements that are selected based on intensity. Other parameters for determining the surrogate(s) such as amplitude, power, etc. may be used.

In one embodiment, the number of frequency elements in a sparse spectrum surrogate may be predetermined (e.g., 16 spectral components for a speech signal). A greater number of spectral components may be used for music. In another embodiment, the number of elements may be determined dynamically and may vary by, for example, time window.

The surrogate $Fs_i(f)$ in Window $W_{i+1}$ of the signal $Fin_i(f)$ in Window $W_i$, for example, may contain 16 or more of the most intense spectral components of $Fin_i(f)$ in order to provide an approximate representation of $Fin_i(f)$ that may be perceptually indistinguishable from the unprocessed signal and can be used to replace the unprocessed signal in the event of a dropout or other information loss affecting window $W_i$. Surrogates of the signal in the current window or one or more windows that preceded the current window are of value in reducing information loss in that these surrogates can replace signals in lost windows that follow the current window.

In step 425, surrogate(s), $Fs_i(f)$, may be stored in a memory. In one embodiment, surrogate(s) may be stored in a storage device, for example, the memory of a transmitting device. Any suitable memory (e.g., remote or local) may be used as necessary and/or desired.

In step 430, surrogate(s) corresponding to neighboring time windows that follow the current window are retrieved from memory. In order to do this the signal to be transmitted is delayed by one or more windows in order encode surrogates from windows that follow the current window.

Neighboring time windows may be considered contiguous time windows or time windows separated by a determinately short time range within the sequence, for example.

In one embodiment, surrogate(s) may be retrieved from a storage device, for example, the memory of a transmitting device. Embodiments may retrieve the surrogate(s) $Fs_{i+1}(f)$, $Fs_{i+2}(f)$, and $Fs_{i+3}(f)$, for example, which correspond to three following neighboring time windows. The number of surrogates that may be retrieved may be selected as is necessary and/or desired.

In step 435, surrogates of signals from neighboring time windows may be embedded within the spectrum representation of the input signal $Fin_i(f)$ in the current time window, $W_i$. The transmission of window Wi may be delayed until surrogates $Fs_{i-1}(f)$, $Fs_{i-2}(f)$, and $Fs_{i-3}(f)$ of input signals $Fin_{i-1}(f)$, $Fin_{i-2}(f)$ and $Fin_{i-3}(f)$ in windows $W_{i-1}$, $W_{i-2}$ and $W_{i-3}$, respectively, have been created, encoded and embedded in input signal $Fin_i(f)$ of window Wi. As a result, signal elements for neighboring time windows may be redundantly generated and embedded in earlier time windows prior to transmission. Similarly, the surrogate(s) representing the input signal, $Fin_i(f)$, in the current time window, $W_i$, may be embedded in earlier time windows. In one embodiment, the surrogates $Fs_{i+1}(f)$, $Fs_{i+2}(f)$, and $Fs_{i+3}(f)$ may be embedded in the spectrum representation of the input signal, $Fin_{i+4}(f)$, in time window, $W_{i+4}$, for example. The resulting representation, $Fout_{i+4}(f)$, may thus contain surrogate(s) of the signals in several time windows embedded in $Fin_{i+4}(f)$. Thus, surrogate information in $Fout_{i+4}(f)$ may be subsequently extracted and decoded in a receiving device, in order to compensate for information loss, such as dropouts of window $W_{i+1}$, and/or window $W_{i+2}$, and/or window $W_{i+3}$.

In one embodiment, the encoding of the surrogates may be such that a person using a device that is not enabled to decode the surrogate(s) will not perceive a change in the intelligibility and/or sound quality of the signal.

Transmission of the signal elements contained in the current time window may be delayed in order to complete creation, storage, and retrieval associated with surrogate(s). The delay may be optional if it is known that a dropout is unlikely and the encoding of surrogates is not needed until dropouts begin to occur.

In step 440, the encoded spectrum representation $Fout_i(f)$ may be transformed to the time domain. In one embodiment, the inverse Fourier transform may be utilized for the transformation. As a result, the encoded spectrum representation with the embedded surrogates is represented by the time function $fout_i(t)$. The encoded signal, $fout_i(t)$, may be perceptually indistinguishable from the initial input signal $fin_i(t)$.

In one embodiment, an inverse transformation may be applied to accomplish transformation to the time-domain. Examples of inverse transformations include, but are not limited to, inverse continuous Fourier transforms, inverse discrete Fourier transforms, inverse fast Fourier transforms, inverse continuous wavelet transforms, inverse discrete wavelet transforms, inverse fast wavelet transforms, and continuous, discrete, short-term, and fast inverse versions of related transforms such as the Laplace, Stieltjes, Z-transform, Hilbert, Gabor, Wigner, Mellin, and Borel transforms, and the like. An optional check may be made to determine if the receiving device is capable of receiving the spectrum representation or other coding of the transmitted signal instead of a time domain signal. Short-term versions of these transforms are appropriate for time signals of finite duration, e.g., 20 ms duration.

In the time-domain analog of a discrete Fourier transform, the summed output of the set of contiguous narrowband filters described above provides an analogous frequency-to-time transform.

In one embodiment, prior to applying the inverse frequency-to-time transform, the surrogates may also be amplified. This may enable the transmitting device to transmit the best quality signal it can to an enabled and/or non-enabled receiving device.

In step 445, the time signals in successive time windows, $fout_i(t)$, $fout_{i+1}(t)$, $fout_{i+2}(t)$, $fout_{i+3}(t)$, etc., may be connected together to form a continuous output time function $fout(t)$ that may be transmitted to one or more receiving devices by conventional methods of audio signal transmission.

In one embodiment, $fout_i(t)$, $fout_{i+1}(t)$ and $fout_{i+2}(t)$, may be stored in memory until $fout_{i+3}(t)$ has been processed. A delay of j windows may be used if distortions or dropouts involving as many as j successive windows are anticipated. The memory capacity of the device may be able to store and process up to j windows. For example, after a delay of j windows, $fout_i(t)$ and $fout_{i+1}(t)$ may be connected, $fout_{i+1}(t)$ and $fout_{i+2}(t)$ may be connected, $fout_{i+2}(t)$ and $fout_{i+3}(t)$ may be connected, etc. to form a continuous time function $fout(t)$ which is then transmitted.

When $fout_i(t)$, $fout_{i+1}(t)$, $fout_{i+2}(t)$ and $fout_{i+3}(t)$ are connected together, discontinuities at the boundaries between adjacent time windows may result in audible clicks. A smoothing operation, known as overlap-add, is commonly used in signal processing to eliminate discontinuities at boundaries between adjacent time windows. The method requires that the signals be analyzed in two parallel channels with the starting points of the windows in Channel 1 occurring in the middle of a concurrent window in Channel 2 so that the windows overlap. In one embodiment, an overlap-add procedure with, for example, 25% overlap may be used in which the first quarter of window $W_{i+1}$ in Channel 1 overlaps the last quarter of window $W_{i+2}$ in Channel 2 and the last quarter of window $W_{i+1}$ in Channel 2 overlaps the first quarter of Window $W_i$ in Channel 1. The weighted sum of the output of the two channels provides a smooth transition from window Wi in Channel 1 to window $W_{i+1}$ in Channel 2 and from window $W_{i+1}$ in Channel 1 to Window $W_{i+2}$ in Channel 2. Although the overlap-add procedure may reduce or eliminate perceptible discontinuities at window boundaries, surrogates embedded in the overlap regions of the windows may be distorted. With 25% overlap half of each time window is not altered by the overlap-add procedure.

If less than 25% overlap is used in the overlap-add procedure, a correspondingly larger portion of each time window is not altered by the overlap-add procedure, but discontinuities at window boundaries may be perceptible. The conventional method of overlap-add uses 50% overlap for each half of the window. For this condition, all of the embedded surrogates may be distorted.

In one embodiment, a modification of a conventional discrete Fourier transform may be used in order to decode surrogates from the time signal in the half window that is still intact after the overlap-add procedure. If a conventional discrete Fourier transform is used to obtain the spectrum of the signal in this half-window, the spacing between frequency elements in the derived discrete frequency spectrum may be twice that of the discrete spectrum for a time signal from a full window. Consequently, a frequency element containing a surrogate in the discrete frequency spectrum with a wider spacing of frequency elements will also contain part of the signal in the neighboring strong frequency element masking the weak frequency element containing the surrogate when the surrogate was initially embedded in the discrete frequency spectrum for a full window.

In one embodiment, the portion of the time signal from an intact half window may be repeated to obtain a time signal equal in duration to that of a full window. The spectrum of this time signal will have frequency elements with the same spacing as that of the discrete frequency spectrum in which the surrogates have been embedded. A modified discrete Fourier transform may be used to derive this discrete frequency spectrum in order to extract the intact surrogates. A discrete Fourier transform multiplies the time signal by a set of orthogonal sinusoidal functions and then obtains the sum of the products at each frequency. The set of orthogonal sinusoidal functions in the modified discrete Fourier transform has the same structure as the time signal being analyzed in that the second half of the set of sinusoidal functions is a repeat of the first half. In order to maintain orthogonality of the set of repeated sinusoidal functions, each frequency element that is an odd multiple of the lowest frequency in the set is reversed in sign for the second half of the set. This modification makes use of the odd-even symmetry of sinusoidal functions.

By repeating a half window to create a full-size window, half of the information contained in the original full window prior to the overlap-add smoothing operation may be lost. When the spectrum of a repeated time signal from an intact half window is derived using the modified discrete Fourier transform, those discrete frequency elements with frequencies that are odd multiples of the lowest frequency will be uniformly zero.

In an embodiment in which 25% overlap is used in the overlap-add procedure to eliminate perceptible discontinuities at window boundaries, surrogates may be encoded in frequency elements that are even multiples of the lowest frequency in a window.

In one embodiment, after applying the inverse frequency-to-time transform, a surrogate identifying the start of a window may be inserted in the transformed time signal. This may be done, for example, using temporal spread of masking.

After smoothing to eliminate perceptible discontinuities at window boundaries and prior to transmitting fout(t), surrogates identifying the starting samples of the windows used in the preceding analyses may be encoded in fout(t). The surrogate is encoded at intervals corresponding to the duration of a window, on average, with some leeway to allow the surrogate to be encoded in the most intense time segment of fout(t) within one window duration of the nominal encoding time.

Various technologies may be used to provide communication between the various components (e.g., processors, memories, etc.) as well as to allow the components to communicate with any other component as necessary and/or desired (e.g., so that the component may obtain further instructions, may access and use remote memory stores, etc.). Such technologies used to provide such communication might include a network, the Internet, Intranet, Extranet, LAN, an Ethernet, wireless communication via cellular tower or satellite, or any client server system that provides communication, for example. Such communications technologies may use any suitable protocol such as TCP/IP, UDP, or OSI, for example. Accordingly, a variety of different configurations are contemplated.

In one embodiment, information regarding the receiving and transmitting devices may be exchanged at any part of a communication, including, for example, during initial set-up, during periodic testing, feedback evaluation, etc.

FIG. 5 illustrates the content and signal processing within a sequence of contiguous time windows, according to one embodiment, in which surrogates of the signal in four consecutive time windows are embedded in the signal to be transmitted. Although this example illustrates the use of three surrogates for three segments or time windows, it should be appreciated that the number of segments/time windows and/or surrogates that are used may be selected as is necessary and/or desired. In addition, in one embodiment, non-consecutive time windows/segments, time windows/segments in other signals, etc. may also be used as is necessary and/or desired.

In Row 1 (515), five contiguous time windows, $W_i$, $W_{i+1}$, $W_{i+2}$, $W_{i+3}$ and $W_{i+4}$ are identified. $W_{i+1}$ is the time window immediately following the current time window, $W_i$. Window $W_{i+2}$ follows window $W_{i+1}$, window $W_{i+3}$ follows window $W_{i+2}$, and window $W_{i+4}$ follows window $W_{i+3}$.

In Row 2 (520), each of the input audio signals delivered to a signal processor (e.g., a transmitter), in each corresponding time window, $\text{fin}_i(t)$, $\text{fin}_{i+1}(t)$, $\text{fin}_{i+2}(t)$, $\text{fin}_{i+3}(t)$ and $\text{fin}_{i+4}(t)$, respectively, may be identified.

In Row 3 (525), the spectrum representations of the input time functions, $\text{Fin}_i(f)$ to $\text{Fin}_{i+4}(f)$, respectively, may be identified.

In Row 4 (530), the surrogates of signals in the immediately preceding time window may be identified. For example, window $W_{i+1}$, may contain surrogate $F_{Si}(f)$ of signal $\text{Fin}_i(f)$ in the preceding window; window $W_{i+2}$ may contain surrogate $Fs_{i+1}(f)$ of signal $\text{Fin}_{i+1}(f)$ in the preceding window; window $W_{i+3}$ may contain surrogate $Fs_{i+2}(f)$ of signal $\text{Fin}_{i+2}(f)$ in the preceding window; and window $W_{i+4}$ may contain surrogate $Fs_{i+3}(f)$ of signal $\text{Fin}_{i+3}(f)$ in the preceding window. The signals and their surrogates may be specified in terms of their frequency representations since most of the signal processing is in the frequency domain. Sparse spectrum representations are used for the surrogates since several surrogates need to be embedded in the signal to be transmitted in each window. Substantially fewer bits may be required for a sparse spectrum representation, thereby allowing for several surrogates to be embedded efficiently in the transmitted signal.

In Row 5 (535), the surrogates of signals in a time window that is subsequently 2 time windows behind the time window of interest may be identified. For example, window $W_{i+1}$, may contain surrogate $Fs_{i-1}(f)$ of signal $Fin_{i-1}(f)$ which is 2 windows behind $W_{i+1}$, Window $W_{i+2}$ may contain surrogate $Fs_i(f)$ of signal $Fin_i(f)$ which is 2 windows behind $W_{i+2}$. Window $W_{i+3}$ may contain surrogate $Fs_{i+1}(f)$ of signal $Fin_{i+1}(f)$ which is 2 windows behind $W_{i+3}$. Window $W_{i+4}$, may contain surrogate $Fs_{i+2}(f)$ of signal $Fin_{i+2}(f)$ which is 2 windows behind $W_{i+4}$.

In Row 6 (540), the surrogates of signals in a time window that is subsequently 3 time windows behind the time window of interest may be identified. For example, window $W_{i+1}$, may contain surrogate $Fs_{i-2}(f)$ of signal $Fin_{i-2}(f)$ which is 3 windows behind $W_{i+1}$. Window $W_{i+2}$, may contain surrogate $Fs_{i-1}(f)$ of signal $Fin_{i-1}(f)$ which is 3 windows behind $W_{i+2}$. Window $W_{i+3}$, may contain surrogate $Fs_i(f)$ of signal $Fin_i(f)$ which is 3 windows behind $W_{i+3}$. Window $W_{i+4}$, may contain surrogate $Fs_{i+1}(f)$ of signal $Fin_{i+1}(f)$ which is 3 windows behind $W_{i+4}$, respectively.

In Row 7 (550), the spectrum of the output signals, $Fout_{i+1}(f)$ to $Fout_{i+4}(f)$, respectively, 545, may be identified. For example, $Fout_{i+4}(f)$ may include the spectrum of the input signal, $Fin_{i+4}(f)$, embedded steganographically with the three surrogates in window $W_{i+4}$, $Fs_{i+1}(f)$, $Fs_{i+2}(f)$ and $Fs_{i+3}(f)$.

In Row 8 (550), the output signals specified as functions of time, $fout_{i+1}(t)$ to $fout_{i+4}(t)$, respectively, may be identified. These signals may then be transmitted.

In this illustrative embodiment, the transmitted output signal, $fout_{i+4}(t)$, in time window, $W_{i+4}$, contains surrogates, $Fs_{i+1}(f)$, $Fs_{i+2}(f)$ and $Fs_{i+3}(f)$, of the input signals, $Fin_{i+1}(f)$, $Fin_{i+2}(f)$ and $Fin_{i+3}(f)$, in time windows, $W_{i+1}$, $W_{i+2}$ and $W_{i+3}$, respectively. If the information in any of these time windows is lost (e.g., as a result of a communication dropout, severe signal distortion, or any other form of information loss), the surrogate corresponding to the lost window may be used to replace the lost information.

Longer periods of information loss, due to multiple communication dropouts, for example, may potentially affect more than one time window in the transmission path. However, in one embodiment, encoding multiple surrogates of multiple neighboring time windows may decrease information loss in long periods of information loss.

In Row 8 (550), the transmission of a signal representation that characterizes an audio signal is identified. The audio signal to be transmitted may contain one or more surrogate(s) that may approximate the input signal in multiple neighboring time windows, according to one embodiment. Each time window may include discrete signal elements that characterize the signal elements identified within the time window. Particularly, multiple signal representations may be transmitted for a time duration that may include information on each of the contiguous time windows $W_{i+1}$, $W_{i+2}$, $W_{i+3}$, and $W_{i+4}$, in the sequence, for example. In one embodiment, the signal representation $fout_{i+4}(t)$ in window $W_{i+4}$ includes signal elements, in the time domain, that are contained within time windows $W_{i+1}$, $W_{i+2}$ and $W_{i+3}$; e.g., the embedded surrogates $Fs_{i+i}(f)$, $Fs_{i+2}(f)$ and $Fs_{i+3}(f)$ encoded in the spectrum representation of $fin_{i+4}(t)$.

For example, an encoding function, $C[Fin_i(f)]$, may encode the surrogate(s) into the phase vector of $Fin_i(f)$ in order to create $Fout_i(f)$. This may be accomplished by encoding the co-ordinates of each corresponding surrogate (frequency and amplitude) into the phase vector of $Fin_i(f)$. Thus, an encoded resultant spectrum representation, $Fout_i(f)$, may be created. In this example, manipulating the phase vector may have little or no effect on the perception of $Fout_i(f)$ since the ear is not sensitive to within ear phase differences.

At a transmitting device, or before transmission, the time signals in concatenated time windows $W_1, W_2 \ldots W_i$ may be joined together to form a continuous time signal fout(t), for transmission to another device. The time representation of the resultant encoded signal, fout(t), including the multiple surrogates encoded in the spectrum of fout(t), may be later transmitted to a receiving device or other signal processor. Thus, the receiving device/signal processor may receive frcvd (t), where frcvd(t)=fout(t) plus fN(t), where frcvd(t) is the signal received by the receiver; fout(t) is the signal sent by the transmitter and fN(t) is noise acquired in the transmission path. Also, since frcvd(t) contains fout(t) plus some noise, fN(t); and fout (t) contains fin(t) with surrogates encoded in the spectrum representation of fin(t), or some other steganographic method of encoding surrogates, the encoded surrogates may also have some noise. The surrogates contain redundant signal information that may be used to approximately recreate signal elements from received time windows $W_{i-1}, W_{i-2}, \ldots W_{i-j}$ in the event of experienced information loss, such as communication dropouts, of any or all of the preceding time windows.

In another embodiment, the surrogates may be received in an opposite sequence in time windows, $W_{i+1}, W_{i+2}, \ldots W_{i+j}$.

In one embodiment, transmission redundancy may be accomplished by transmitting multiple instances of surrogates across multiple time windows. The redundancy achieved in transmitting multiple surrogates of the signals may further compensate for information loss. Increasing the number of time windows may require additional redundancy in the form of additional surrogates which may require additional memory and may require a longer time delay in extracting and decoding the surrogates. For example, a communication dropout may be experienced for a duration spanning J time windows. To compensate for a communication dropout involving any combination of the J windows, including a communication dropout of all J windows, may require the storage and encoding of J surrogates and a delay that may be equal to the duration of the J windows. In another embodiment, the delay may be shorter or longer than the J windows.

A large number of surrogates may be embedded in the transmitted signal using fewer bits to encode each surrogate. Reducing the number of bits for encoding the surrogates allows dropouts of longer duration to be covered, but at the cost of reduced quality of the recovered signal. In one embodiment the surrogates may be encoded using an adaptive strategy whereby the quality of the recovered signal is perceptually indistinguishable from a distortion free uninterrupted transmitted signal for dropouts of short duration. For dropouts of long duration adaptive encoding of the surrogates may be implemented such that the recovered signal is intelligible without interruption, but of reduced signal quality.

In one embodiment, additional coding of the signal that might otherwise be affected by information loss in the transmission path may be provided as is necessary and/or desired.

In one embodiment, compensation for signal information that may be lost during a dropout spanning multiple contiguous time windows may be provided if at least one window received by the receiving device contains a surrogate(s) of the dropped time window(s). In one embodiment, the receiving device may combine multiple surrogates as they are received to provide a better approximation of the lost signal information.

Three separate versions of the surrogates $Fs_{i+1}(f)$ are available in the group of three contiguous windows $W_{i+2}$, $W_{i+3}$ and $W_{i+4}$. Information loss from a communication dropout of window $W_{i+1}$ may be addressed when Window $W_{i+4}$ is processed. Compensating for a dropout of Window $W_{i+1}$ when Window $W_{i+4}$ is processed may introduce a time delay equal to the duration of three time windows.

An embodiment employing surrogates of the signals in fewer windows may reduce the time delay in compensating for information loss, but with reduced effectiveness in decreasing potential dropouts and other forms of information loss, particularly if more than one neighboring time window is subject to a dropout or information loss.

The use of surrogates from a larger number of time windows not only improves effectiveness in decreasing information loss involving more than one neighboring time window, it also improves the signal-to-noise ratio of the received signals since the noise acquired in the transmission path reduces the signal-to-noise ratio in the received signal and, concomitantly, the signal-to-noise ratio in the corresponding surrogates. Averaging common surrogates from different time windows is an efficient way to improve the signal-to-noise ratio. Additional methods of combining common surrogates may be used as necessary and/or desired.

Figure 6:
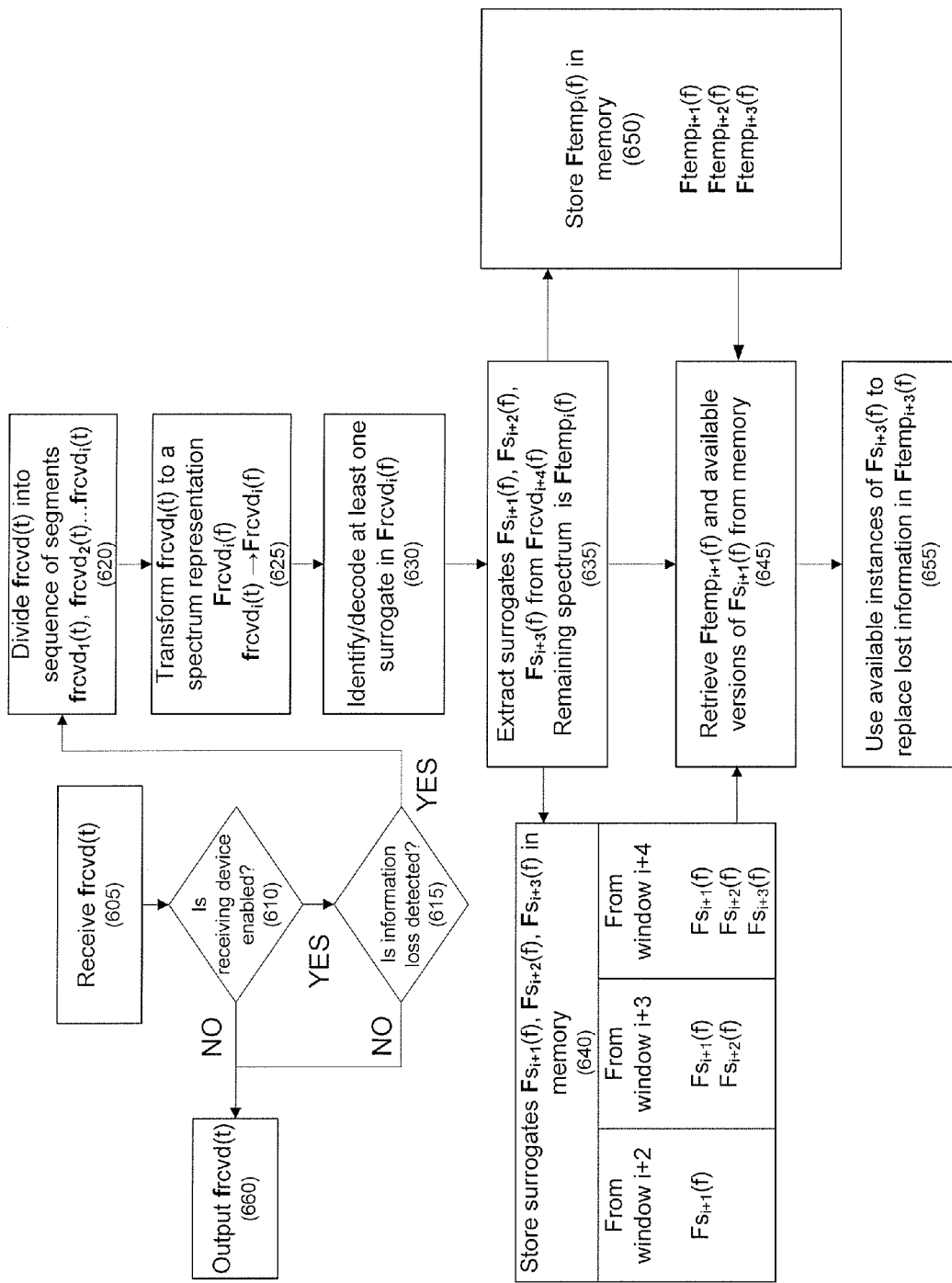
FIG. 6 depicts a method for electronic communications having decreased information loss according to one embodiment.

FIG. 6 depicts a method for decreasing information loss at a receiving device according to one embodiment. As with FIG. 4, and for convenience, this method is described using signal time windows; it should be recognized that this method is not limited to the use of time windows, and it may be used with signal segments, signal portions, etc.

The input to this receiving device may be a signal encoded and transmitted as described above. For purposes of illustration, the signal includes encoded surrogates for three neighboring windows. The receiving device depicted in FIG. 6 receives and decodes a signal embedded with surrogates of signal segments encoded in other portions of the signal.

In step 605, a signal may be received and monitored by the receiving device. In one embodiment, the received audio signal is received as a time function, frcvd(t) where frcvd(t) is equal to the transmitted signal, fout(t), plus noise, $f_N(t)$, which may be acquired in the transmission path. In another embodiment, the signal may be received as a regenerated signal, sparse spectrum representation, or other coding appropriate to the capabilities of the receiving device.

In step 610, a determination may be made to determine whether a receiving device is enabled or is otherwise capable of decoding the encoded surrogates.

In one embodiment, if the receiving device is determined to be non-enabled, the signal is output without processing or decoding of the surrogates in step 660.

In another embodiment, an assumption may be made that the device is an enabled device or a non-enabled device. This may be based on, for example, the communication network, device type, etc. In another embodiment, a default type of receiving device may be used.

In one embodiment, if the receiving device is determined to be an enabled receiving device, in step 615, the receiving device determines if information loss is detected during one or more time windows. For example, the number of contiguous time windows experiencing information loss, or the expected number of contiguous time windows likely to experience information loss based on previous transmissions may be used to determine how many following time windows need surrogates to minimize information loss. This determination may be done dynamically to reduce the time delay in encoding and transmitting surrogates. Other methods and techniques for determining the number of time windows may be used as necessary and/or desired.

In one embodiment, information loss may be determined based on a sensed communication interruption, partial loss of information, no information received during a specified time period, an indication received from the transmitter, and the like. One or any combination of the aforementioned conventional information loss detection techniques, or other techniques, may be employed as necessary and/or desired.

In one embodiment, if an information loss (e.g., a communication dropout) is not sensed by the receiving device (e.g., no indication that information was lost), then the receiving device may output the signal for the listener in step 660 without processing to decode the surrogates. Any other signal processing to improve the signal quality may be applied as is necessary and/or desired.

In one embodiment, if the signal is received as a spectrum representation, then the inverse transformation may be applied along with any other signal processing that may be necessary and/or desired to improve signal quality before the time domain signal is output for the user in step 660.

In step 620, the received signal, frcvd(t) may be divided into a sequence of contiguous time windows. The input signal, frcvd(t), may be divided into a sequence of contiguous time windows, $W_1$, $W_2$, $W_3$, ... $W_i$, with the time function within time window $W_i$ being represented by $frcvd_i(t)$. The windows thus identified are synchronous with the time windows in the transmitting device. The time signal in window $W_{i+4}$, $frcvd_{i+4}(t)$, contains $fout_{i+4}(t)$ plus some noise, $f_{N_{i+4}}(t)$, and $fout_{i+4}(t)$ contains $fin_{i+4}(t)$ with the surrogates $Fs_{i+1}(f)$, $Fs_{i+2}(f)$ and $Fs_{i+3}(f)$ encoded in the spectrum representation of $fin_{i+4}(t)$, or some other steganographic method of encoding surrogates. The surrogates contain redundant signal information which can potentially be used to approximately recreate signal elements from received time windows $W_{i+1}$, $W_{i+2}$ and $W_{i+3}$, at least, in the event of experienced information loss, such as communication dropouts, distortion, etc. in any or all of the preceding time windows.

In one embodiment, at least one surrogate encoded in intense time segments of frcvd(t) may be identified and decoded to identify the initial samples of the time windows used by the transmitting device. This information may be used to divide frcvd(t) into a sequence of contiguous time windows, $W_1$, $W_2$, $W_3$, ... $W_i$, that are synchronous with the corresponding time windows used by the transmitting device and where the time signal in $W_1$ is represented by $frcvd_i(t)$. Since the number of samples in each time window is known, errors in decoding the starting sample of a window may be corrected from data on the initial samples of neighboring windows.

In step 625, signal analysis may be performed on the received signal $frcvd_i(t)$ in order to transform the time function to a spectrum representation that may be characterized in the frequency domain. The transformation may be accomplished by means of a time-to-frequency transform of $frcvd_i(t)$. The same transform used in encoding the surrogates, as identified above, may be used in order to generate the spectrum representation of the signal $Frcvd_i(f)$. Subsequently, $Frcvd_i(f)$ may be employed for further analysis of the signal and associated surrogate(s).

In step 630, at least one surrogate in the time function identifying the starting sample may also identify a frequency element containing a surrogate which, in turn, contains information on where to find other surrogates embedded in frequency elements.

In step 635, one or more surrogates may be extracted from the spectrum representation, $Frcvd_i(f)$. Extracting and decoding the surrogates may be accomplished by identifying the surrogate(s) in either the masking range of the strong frequency elements or in the phase vector, or in frequency band offsets, etc.

In one embodiment, the surrogates from multiple neighboring time windows, $Fs_{i+1}(f)$, $Fs_{i+2}(f)$ and $Fs_{i+3}(f)$, may be extracted from the representation $Frcvd_{i+4}(f)$. The spectral components that remain after extraction (i.e., the signal without surrogates) may comprise the spectrum $Ftemp_{i+4}(f)$, where $Ftemp_{i+4}(f)$ is equal to $Fin_{i+4}(f)$ plus noise acquired in the transmission path, $FN_{i+4}(f)$.

In one embodiment, a memory may be employed for storing temporary spectra associated for multiple neighboring time windows. For example, temporary spectra $Ftemp_{i+1}(f)$, $Ftemp_{i+2}(f)$ and $Ftemp_{i+3}(f)$, may be stored in a memory of the receiving device. Any suitable memory (i.e., remote or local) may be used as necessary and/or desired. In one embodiment, stacked memory (e.g., first in, first out) may be used so that as new temporary spectra are saved, the older temporary spectra may be discarded.

In step 640, the extracted, or decoded, surrogates $Fs_{i+1}(f)$, $Fs_{i+2}(f)$ and $Fs_{i+3}(f)$, may be stored in a memory. In one embodiment, surrogate(s) may be stored in a storage device, such as the memory of a transmitting device. Any suitable memory (i.e., remote or local) may be used as necessary and/or desired. In one embodiment, stacked memory (e.g., first in, first out) may be used so that as new surrogates are saved, the older surrogates may be discarded.

In one embodiment, a memory may be employed for storing extracted surrogates from multiple neighboring time windows. For example, surrogates $Fs_{i+1}(f)$, $Fs_{i+2}(f)$ and $Fs_{i+3}(f)$ may be extracted from windows $W_{i+2}$, $W_{i+3}$ and $W_{i+4}$, respectively, as identified in FIG. 5, and stored in memory 640.

In memory, the surrogates $Fs_{i-1}(f)$, $Fs_i(f)$ and $Fs_{i+1}(f)$ may also be stored. For example, as shown in FIG. 5, these surrogates are associated with window $W_{i+2}$. Associated with window, $W_{i+3}$, the surrogates $Fs_i(f)$, $Fs_{i+1}(f)$, and $Fs_{i+2}(f)$ may be stored and surrogates $Fs_{i+1}(f)$, $Fs_{i+2}(f)$, and $Fs_{i+3}(f)$ identified with window $W_{i+4}$ in FIG. 5 may be stored. Therefore, the multiple versions of surrogate $Fs_{i+1}(f)$ (i.e., surrogates of the signal in time windows $W_{i+2}$, $W_{i+3}$ and $W_{i+4}$, that may have been received in separate windows, may be decoded and the signal element information subsequently combined, thereby compensating, if necessary, for the loss of information in window $W_{i+1}$. The versions of surrogate $Fs_{i+1}(f)$ from separate time windows will differ slightly as a result of noise acquired in the transmission path. The separate versions of $Fs_{i+1}(f)$ may be combined to reduce the noise acquired in the transmission process.

In step 645, the temporary spectrum, $Ftemp_{i+1}(f)$, is retrieved from memory 650 and the corresponding available versions of the surrogate $Fs_{i+1}(f)$ are retrieved from memory, (i.e., separate versions of $Fs_{i+1}(f)$ as obtained from windows $W_{i+2}$, $W_{i+3}$ and $W_{i+4}$ and stored in memory).

In step 655, the multiple surrogates may be used to replace any lost information if window $W_{i+1}$ is subject to a communication dropout or other form of information loss. The lost information can be retrieved even if two of the three $Fs_{i+1}(f)$ surrogates are also lost if several neighboring windows are subject to a communication dropout. In another embodiment, if more than one version of $Fs_{i+1}(f)$ is available, the separate versions of $Fs_{i+1}(f)$ may be combined to reduce the noise acquired in the transmission process. As discussed above, the surrogates may also have some noise acquired in the transmission process. The combined $Fs_{i+1}(f)$ surrogate(s) may be employed to regenerate a more accurate approximation to replace omitted signal elements of the input signal (e.g., speech) due to the information loss.

In one embodiment, if there is no information loss, but the received signal has acquired some noise in the transmission process, then an average of the estimated signal $Fin_{i+1}(f)$ and the three versions of its surrogate, $Fs_{i+1}(f)$, which are also estimates of $Fin_{i+1}(f)$ may be averaged to obtain $Fin_{i+1}(f)$ with an improved signal to noise ratio.

The received signal frcvd(t) consists of a series of time windows that are synchronous with the transmitted time windows. If there is no information loss, such as a dropout, the received signal $frcvd_i(t)$ in Window $W_i$ consists of the transmitted signal $fout_i(t)$ and noise $fN_i(t)$ acquired during the transmission process. In the current example, a set of three surrogates are employed to provide immunity against dropouts and other forms of information loss.

A received signal may include a series of time windows, and each window may consist of encoded surrogate(s). If the surrogate $Fs_{i+1}(f)$ is of interest, the surrogate may be encoded in the signal representations received in windows $W_{i+2}$, $W_{i+3}$ and $W_{i+4}$, for the specific case considered in this example. An encoding function employed for the aforementioned windows may generate the received signals.

The surrogates may be extracted from the received signal and restored to their original form. However, the noise acquired in the transmission path will result in a restored signal with some background noise. If window $W_{i+1}$ is lost as a result of a dropout, signal $Fin_{i+1}(f)$ in window $W_{i+1}$ may be replaced by its surrogate $Fs_{i+1\_}(f)$. There are 3 separate versions of $Fs_{i+1}(f)$ in memory, each with some noise acquired in transmission. The average of the three versions of $Fs_{i+1}(f)$ will be an improved estimate of $Fin_{i+1}$ (f) with a higher signal-to-noise ratio. If windows $W_{i+1}$ and $W_{i+2}$, are lost as a result of dropouts, there are two remaining versions of $Fs_{i+1}(f)$ allowing for the restoration of signal $Fin_{i+1}(f)$ with a lower signal-to-noise ratio. If windows $W_{i+1}$, $W_{i+2}$ and $W_{i+3}$ are lost as a result of dropouts, there is only one version of $Fs_{i+1}(f)$ remaining allowing for the restoration of signal $Fin_{i+1}(f)$ with a poorer signal-to-noise ratio. There is thus a predictable trade-off between the duration of a dropout and the signal-to-noise ratio of the restored signal for transmission in a noisy channel with dropouts.

In an embodiment, averaging the input signal extracted from the received signal with surrogates of the input signal from neighboring time windows may improve the signal-to-noise ratio after transmission in a noisy transmission path. If the information in a time window is lost because of a dropout or other forms of information loss, one or more of the surrogates of the lost signal in neighboring time windows may be used to decrease information loss.

If the transmission path is noisy, the replacement of the missing information will also be affected by the noise. If more than one surrogate is available, an improved estimate of the missing information is possible by averaging the surrogates from separate time windows. This technique may also be used to improve the signal-to-noise ratio for signals transmitted over a noisy transmission path if there are no lost signals due to dropouts or other forms of information loss. In this implementation the noisy input signal, $fin_i(t)+fN_i(t)$, extracted from the received signal, $frcvd_i(t)$, is averaged with surrogates of $fin_i(t)$ from neighboring windows to improve the signal-to-noise ratio.

In one embodiment, regenerating an approximation of the signal may be accomplished by transforming the surrogates back into their original values in frequency and time. For example, a frequency-to-time transform, such as an inverse Fourier transform, may be applied to the surrogates, restoring the signal to the time domain. Other inverse operations, discussed above, may be used as necessary and/or desired. The regenerated approximation may be further employed to replace omitted signal elements of the input signal (e.g., speech) due to information loss, or to replace a signal subjected to severe distortions.

Optionally, the signal may be output for a person after processing for decreasing information loss is complete.

Hereinafter, general aspects of implementation of the systems, devices, and methods of the invention will be described.

The system of the invention or portions of the system of the invention may be in the form of a "processing component," such as a general purpose computer, for example. As used herein, the term "processing component" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit), a Reduced Instruction Set Computer (RISC) or other integrated circuit, a logic circuit, a digital signal processor, a programmable logic device such as a FPGA, PLD, PLA or PAL, or any other device or arrangement of devices that is capable of implementing the steps of the processes of the invention. Any or all of these processing machines may be implemented in a variety of devices, such mobile phones/devices, landline telephones, hearing aids, personal amplification devices, assistive listening devices, video and audio conferencing systems, voice over IP devices, streaming radio devices, two-way radios, tablet computers, desktop and notebook computers, workstations, electronic reading devices, etc.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same physical or geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cellular tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software, for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its embodiments, it is to be understood that this invention is only illustrative and exemplary of the present invention and is made to provide an enabling invention of the invention. Accordingly, the foregoing invention is not intended to be construed or to limit the present invention or otherwise to exclude any other such embodiments, adaptations, variations, modifications or equivalent arrangements.

What is claimed is:

1. A method for processing a signal for transmission over a communication network, comprising:
   at least one signal processor identifying a first segment of a signal;
   the at least one signal processor generating a representation of the first segment of the signal;
   the at least one signal processor identifying a first plurality of surrogate candidates in the representation of the first segment of the signal;
   the at least one signal processor generating a representation of a second segment of the signal; and
   the at least one signal processor encoding the first plurality of surrogate candidates as a first plurality of surrogates in the representation of the second segment of the signal.

2. The method of claim 1, wherein the second segment precedes the first segment.

3. The method of claim 1, wherein the step of the at least one signal processor identifying a first segment of a signal comprises:
   the at least one signal processor dividing a signal into a plurality of segments, each segment having the same time duration.

4. The method of claim 1, wherein the first segment and the second segment have different durations.

5. The method of claim 1, wherein a duration of at least one of the first segment and the second segment is dynamically determined.

6. The method of claim 1, wherein the step of generating a representation of the first segment of the signal comprises:
   a plurality of filters filtering the first segment of the signal; and
   attenuating an output of the plurality of filters having a level below a predetermined threshold.

7. The method of claim 1, wherein the representation of the first segment and the representation of the second segment are generated as spectrum representations using a time-to-frequency transformation.

8. The method of claim 1, further comprising:
   transmitting the first segment of the signal and the second segment of the signal comprising the first plurality of surrogates over a communication network.

9. The method of claim 8, wherein the transmission of the signal is delayed during at least one of the detection, generation, and encoding steps.

10. The method of claim 8, further comprising:
    the at least one signal processor combining the first segment of the signal and the second segment of the signal comprising the first plurality of surrogates prior to transmission.

11. The method of claim 8, wherein the first segment of the signal and the second segment of the signal comprising the first plurality of surrogates are transmitted in parallel.

12. The method of claim 1, further comprising:
    transmitting the second segment of the signal comprising the first plurality of surrogates over a communication network.

13. The method of claim 1, further comprising:
    the at least one signal processor generating a representation of a third segment of the signal;
    the at least one signal processor identifying a second plurality of surrogate candidates in the representation of the second segment of the signal; and
    the at least one signal processor encoding the first plurality of surrogate candidates as a first plurality of surrogates and the second plurality of surrogate candidates as a second plurality of surrogates in the representation of the third segment of the signal.

14. A method for processing a signal for transmission over a communication network, comprising:
    at least one signal processor dividing a signal into a plurality of time windows;
    the at least one signal processor generating a representation of a first time window;
    the at least one signal processor identifying a first plurality of surrogate candidates in the representation of the first time window;
    the at least one signal processor generating a representation of a second time window; and
    the at least one signal processor encoding the first plurality of surrogate candidates as a first plurality of surrogates in the representation of the second time window.

15. The method of claim 14, further comprising:
    the at least one signal processor generating a representation of a third time window;
    the at least one signal processor identifying a second plurality of surrogate candidates in the representation of the second time window; and
    the at least one signal processor encoding the first plurality of surrogate candidates as a first plurality of surrogates and the second plurality of surrogate candidates as a second plurality of surrogates in the representation of the third time window.

16. The method of claim 14, further comprising:
    transmitting the first time window, the second time window comprising the encoded first plurality of surrogates, and the third time window comprising the encoded first plurality of surrogates and encoded second plurality of surrogates over a communication network.

17. A method for processing a signal for transmission over a communication network, comprising:
    at least one signal processor identifying a segment i of a signal;
    the at least one signal processor identifying a plurality of surrogate candidates in the N segments of the signal following segment i to be encoded as surrogates in segment i of the signal;
    the at least one signal processor generating representations of the N segments of the signal; and
    the at least one signal processor encoding the representations of the N segments of the signal as a plurality of surrogates encoded in the representation of segment i of the signal.

18. A method for processing a signal that is received over a communication network, comprising:
    at least one signal processor at an electronic device receiving a signal comprising a plurality of segments;
    the at least one signal processor detecting information loss in a first segment;
    the at least one signal processor retrieving a first plurality of surrogates representing the first segment embedded in a second segment; and
    the at least one signal processor generating an estimate of the first segment from the retrieved first plurality of surrogates.

19. The method of claim 18, wherein the second segment is received prior to the first segment.

20. The method of claim 18, wherein the step of the at least one signal processor retrieving a first plurality of surrogates representing the first segment embedded in a second segment comprises:
    the at least one signal processor generating a representation of the second segment; and
    the at least one signal processor identifying the first plurality of surrogates in the representation of the second segment.

21. The method of claim 18, further comprising:
    the at least one signal processor retrieving a second plurality of surrogates representing the first segment from a third segment;
    wherein the at least one signal processor generates the estimate of the first segment from the first plurality of surrogates and the second plurality of surrogates.

22. The method of claim 21, wherein the step of the at least one signal processor retrieving a second plurality of surrogates representing the first segment from the third segment comprises:
    the at least one signal processor generating a representation of the third segment; and
    the at least one signal processor identifying the second plurality of surrogates in the representation of the third segment.

23. The method of claim 18, wherein the transmission error in the first segment occurs when the first segment is missing.

24. The method of claim 18, wherein the transmission error in the first segment occurs when the first segment is distorted.

25. The method of claim 18, wherein the reproduction of at least one of the segments is delayed during at least one of the detection, retrieving, and generating steps.

26. A communication device for transmitting a signal in a communication system, comprising;
   a memory;
   at least one signal processor that performs the following:
      receive a signal;
      generate a representation of a first segment of the signal;
      identify a first plurality of surrogate candidates in the representation of the first segment;
      generate a representation of a second segment; and
      encode the first plurality of surrogate candidates as a first plurality of surrogates in the representation of the second segment.

27. The communication device of claim 26, wherein the at least one signal processor generates a representation of the first segment using a plurality of filters to filter the first segment of the signal, and attenuates an output of the plurality of filters having a level below a predetermined threshold.

28. The communication device of claim 26, wherein the representation of the first segment and the representation of the second segment are generated by the at least one signal processor as spectrum representations using a time-to-frequency transformation.

29. The communication device of claim 26, wherein the signal is received from an input device.

30. The communication device of claim 29, wherein the input device is at least one of a microphone and a camera.

31. The communication device of claim 26, wherein the signal is received from the memory.

32. The communication device of claim 26, wherein the signal is received from a communication network.

33. The communication device of claim 26, wherein the at least one signal processor further performs the following:
   generate a representation of a third segment;
   identify a second plurality of surrogate candidates in the representation of the second segment; and
   encode the first plurality of surrogate candidates as a first plurality of surrogates and the second plurality of surrogate candidates as a second plurality of surrogates in the representation of the third segment.

34. A communication device for processing a received signal in a communication system, comprising;
   a memory; and
   at least one signal processor that performs the following:
      receive a signal comprising a plurality of segments;
      detect a transmission error in the signal in a first segment;
      retrieve a first plurality of surrogates representing the first segment embedded in a second segment; and
      generate an estimate of the first segment from the retrieved first plurality of surrogates.

35. The communication device of claim 34, wherein the at least one signal processor further performs the following:
   retrieve a second plurality of surrogates for the first segment that are encoded in a third segment; and
   generate an estimate of the first segment from the first plurality of surrogates and the second plurality of surrogates.

36. The communication device of claim 34, further comprising:
   an output for reproducing the estimate of the first segment.

* * * * *